US009322736B2

(12) United States Patent
Peeler et al.

(10) Patent No.: US 9,322,736 B2
(45) Date of Patent: Apr. 26, 2016

(54) INTEGRATED SAFETY AND MOTION CONTROL TESTING DEVICE

(71) Applicants: Scott C. Peeler, Sandy, UT (US); Brian W. Guest, Farmington, UT (US); Christopher H. Jensen, Stansbury Park, UT (US)

(72) Inventors: Scott C. Peeler, Sandy, UT (US); Brian W. Guest, Farmington, UT (US); Christopher H. Jensen, Stansbury Park, UT (US)

(73) Assignee: ZAXIS, INC., Salt Lake City, UT (US)

(*) Notice: Subject to any disclaimer, the term of this patent is extended or adjusted under 35 U.S.C. 154(b) by 329 days.

(21) Appl. No.: 13/951,741

(22) Filed: Jul. 26, 2013

(65) Prior Publication Data

US 2014/0033798 A1 Feb. 6, 2014

Related U.S. Application Data

(60) Provisional application No. 61/676,234, filed on Jul. 26, 2012.

(51) Int. Cl.
*G01M 3/02* (2006.01)
*G01M 99/00* (2011.01)

(52) U.S. Cl.
CPC .............. *G01M 3/02* (2013.01); *G01M 99/00* (2013.01)

(58) Field of Classification Search
CPC ....... G01M 3/02; G01M 13/00; G01M 99/00; G01M 99/007; G01M 99/008
See application file for complete search history.

(56) References Cited

U.S. PATENT DOCUMENTS

| 3,751,973 A * | 8/1973 | Strauss | G01M 3/02 73/45 |
| 5,554,931 A * | 9/1996 | Allison | G01R 31/16 156/64 |
| 5,564,888 A * | 10/1996 | Doan | B65G 47/914 414/738 |
| 6,035,793 A * | 3/2000 | Nishio | D05B 35/068 112/152 |
| 7,293,451 B2 * | 11/2007 | Dowd | G01N 3/58 73/105 |

(Continued)

FOREIGN PATENT DOCUMENTS

| WO | WO 89/04141 A1 | 5/1989 |
| WO | WO 2006/047737 A2 | 5/2006 |

*Primary Examiner* — Peter Macchiarolo
*Assistant Examiner* — Natalie Huls
(74) *Attorney, Agent, or Firm* — David B. Tingey; Bryant J. Keller; Kirton McConkie

(57) ABSTRACT

In accordance with some implementations of the described invention, a testing device is provided which includes a safety shield having one or more motion control cam tracks, wherein the cam tracks are configured to receive a cam follower that is connected to a mounting member onto which is mounted one or more testing modules. The testing modules perform specific functions for testing a sample product. The mounting member is moved within the safety shield as the cam follower tracks within the motion control cam tracks. In such implementations, the mounting member is further connected to two or more hydraulic cylinders or other actuators which are configured to move the mounting member to various positions within an x-axis and a y-axis. The integrated safety and motion control features of the safety shield provide precise, repeatable movement of the mounting member while preventing injuring to a user. Other implementations are also described.

11 Claims, 12 Drawing Sheets

(56) References Cited

U.S. PATENT DOCUMENTS

| | | | | |
|---|---|---|---|---|
| 7,509,863 | B2* | 3/2009 | Weier | G01B 13/10 73/37 |
| 7,625,027 | B2* | 12/2009 | Kiaie | B25J 15/0052 294/188 |
| 8,485,772 | B1* | 7/2013 | Ismail | H01L 21/6773 414/416.08 |
| 9,151,693 | B1* | 10/2015 | Yang | G01M 7/06 |
| 2005/0107749 | A1* | 5/2005 | Smith | A61B 5/1427 604/263 |
| 2006/0064061 | A1* | 3/2006 | Solomon | A61M 5/158 604/110 |
| 2006/0269384 | A1* | 11/2006 | Kiaie | B25J 9/0096 414/222.02 |
| 2007/0125531 | A1* | 6/2007 | Dallas | E21B 47/1025 166/75.13 |
| 2008/0173067 | A1* | 7/2008 | Farina | B05B 11/30 73/1.16 |
| 2010/0204612 | A1* | 8/2010 | Choi | A61B 5/1411 600/583 |
| 2010/0286623 | A1* | 11/2010 | Liversidge | A61M 5/326 604/198 |
| 2010/0298739 | A1* | 11/2010 | Steube | A61M 5/3216 600/576 |
| 2011/0092855 | A1* | 4/2011 | List | A61B 5/1411 600/583 |
| 2013/0055825 | A1* | 3/2013 | Michopoulos | G01N 3/08 73/857 |
| 2013/0104991 | A1* | 5/2013 | Matsui | F15B 19/005 137/1 |

* cited by examiner

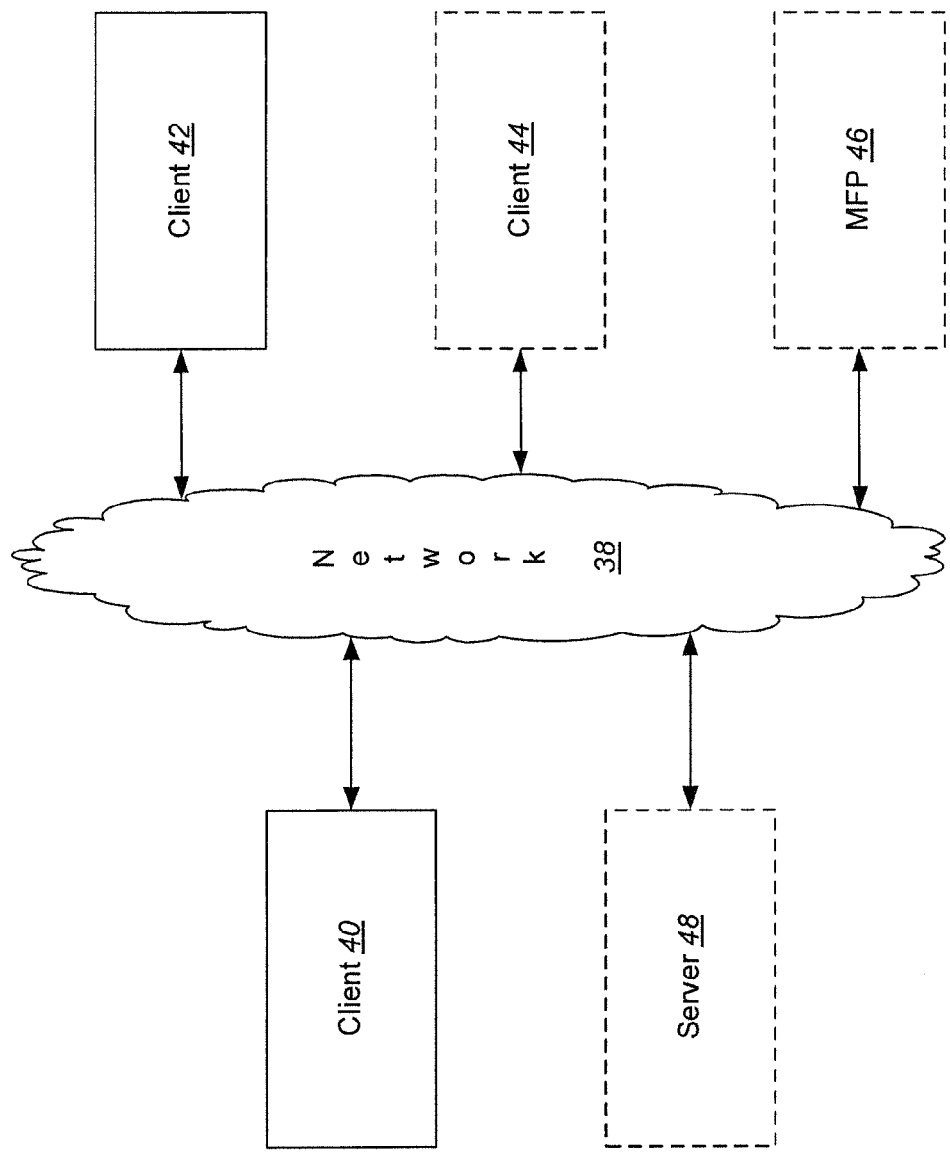

INTEGRATED SAFETY AND MOTION CONTROL TESTING DEVICE

CROSS-REFERENCE TO RELATED APPLICATION

This application claims priority to U.S. Provisional Patent Application Ser. No. 61/676,234, filed Jul. 26, 2012, and entitled "INTEGRATED SAFETY AND MOTION CONTROL TESTING DEVICE;" the entire disclosure of which is hereby incorporated by reference.

BACKGROUND OF THE INVENTION

1. Field of the Invention

The present invention relates to testing devices. In particular, some implementations of the present invention relate to a testing device that is configured to remove a cap from a sample product or device (such as an IV line), test the sample product for leaks or for another characteristic, and to then replace the cap on the device. While the testing device can include any suitable component that allows it to function as described, in some implementations, it includes a safety shield which acts as an anti-pinch guard, and which also includes one or more motion control cam tracks that are configured to control movement of one or more testing modules encased within the shield. Accordingly, in some such implementations, the safety shield is able to perform multiple functions, acting both as a safety apparatus and as a linear motion control apparatus.

2. Background and Related Art

Quality control is a process by which entities review the quality of a variety of factors involved in production, and, in some instances, in which products are tested to discover defects which may affect the release of a product for sale or distribution. While quality control procedures for products can test for a wide variety of aspects or features of a product, some quality control procedures include product inspection, where a product is examined visually to detect defects, such as cracks, malformations, or surface blemishes.

Some defects are unable to be detected visually. Accordingly, some automated testing modules have been designed and customized to test various parameters of a product. In this regard, automated testing units often incorporate a number of moving parts and elaborate mechanisms designed to move sample products or devices through the testing unit. These moving parts often present pinching hazards to the user. Safety shields may be added by the user to reduce these hazards. Generally, however, a user must identify the pinching hazards and construct a safety shield which provides protection and does not impinge on the movements of the various components of the automated testing unit. This process often results in a bulky, ill-suited safety shield. Further, this process generally results in increased costs to the user, which costs may deter the user from providing a safety shield.

Thus, while techniques currently exist that are used in quality control testing systems, challenges still exist. Accordingly, it would be an improvement in the art to augment or even replace current techniques with other techniques.

SUMMARY OF THE INVENTION

The present invention relates to testing devices. In particular, some implementations of the present invention relate to a testing device that is configured to remove a cap from a sample product (such as an IV line), test the sample product for leaks or for another characteristic, and to then replace the cap on the device. While the testing device can include any suitable component that allows it to function as described, in some implementations, it includes a safety shield which acts as an anti-pinch guard, and which also includes one or more motion control cam tracks that are configured to control movement of one or more testing modules encased within the shield. Accordingly, in some such implementations, the safety shield is able to perform multiple functions, acting both as a safety apparatus and as a linear motion control apparatus.

Some implementations of the present invention provide a testing device having a base to which is mounted a sample adapter. The sample adapter is configured to receive a sample product or device for testing. The testing device further includes a mounting member which is coupled to a first and second actuator (e.g., hydraulic cylinder), wherein the second actuator (e.g., hydraulic cylinder) is further coupled to the base. The mounting member further includes a plurality of testing modules which are configured to contact the sample product and perform one or more testing functions as part of a testing procedure. Further still, the mounting member includes one or more cam followers.

The testing device further includes a safety shield having one or more motion control cam tracks comprising a groove or channel formed on an inner surface. The motion control cam tracks are configured to compatibly receive the one or more cam followers of the mounting member. The motion control cam tracks limit or control the movement of the mounting member through the interior space of the safety shield. In some instances, the first or second actuator (e.g., hydraulic cylinder) further include one or more cam followers which are configured to ride within an additional motion control cam track provided on an inner surface of the safety shield. Thus, the present invention provides a safety shield having an integrated, bi-directional system of motion control cam tracks to provide precise, repeatable, and safe movement of a mounting member as part of a sample product testing device.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIG. 2 shows a representative networked computer system suitable for use with embodiments of the invention;

DETAILED DESCRIPTION OF THE INVENTION

Figure 1:
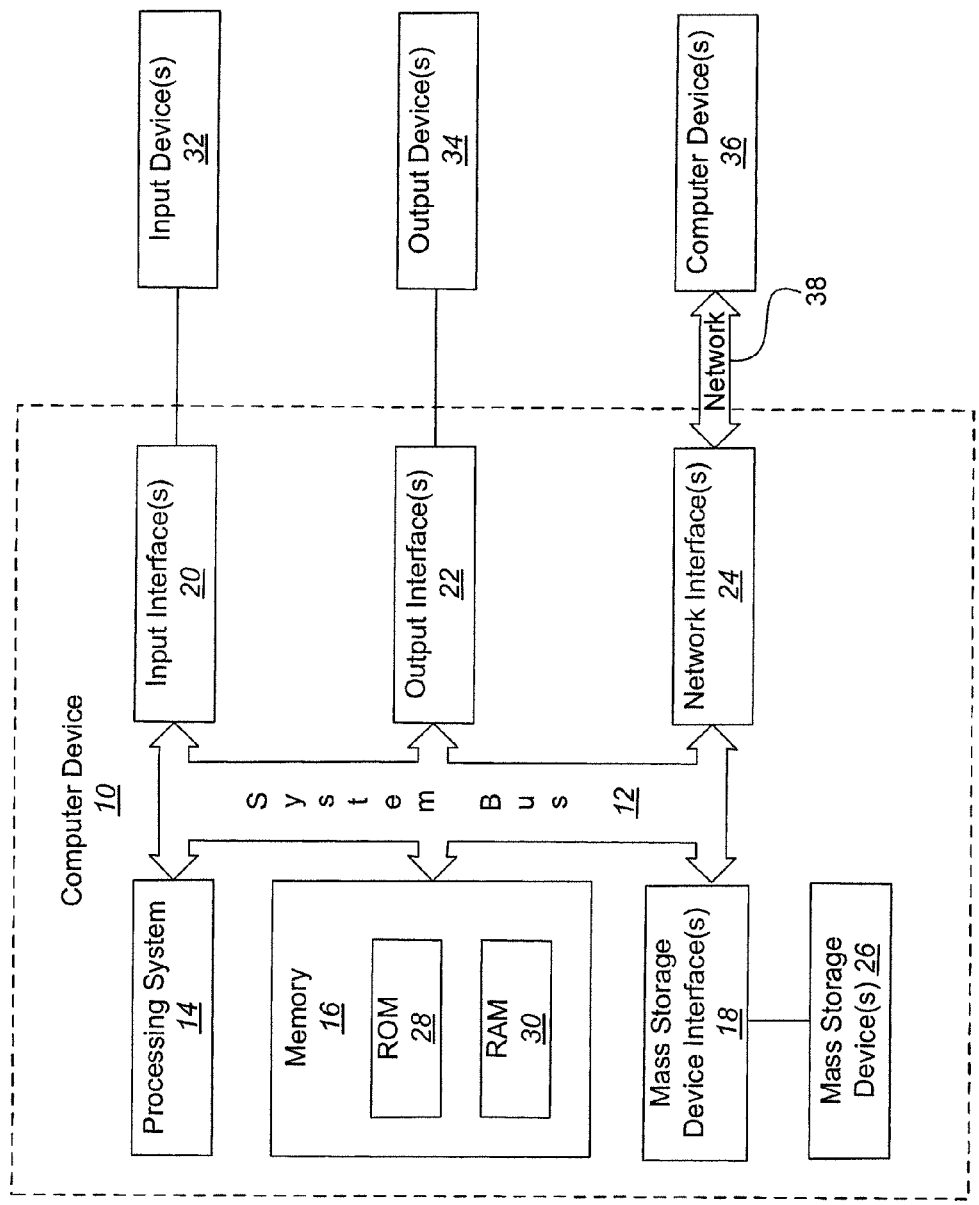
FIG. 1 shows a representative computer system suitable for use with embodiments of the invention.

The present invention relates to testing devices. In particular, some implementations of the present invention relate to a testing device that is configured to remove a cap from a sample product (such as an IV line), test the sample product for leaks or for another characteristic, and to then replace the cap on the device. While the testing device can include any suitable component that allows it to function as described, in some implementations, it includes a safety shield which acts as an anti-pinch guard, and which also includes one or more motion control cam tracks that are configured to control movement of one or more testing modules encased within the shield. Accordingly, in some such implementations, the safety shield is able to perform multiple functions, acting both as a safety apparatus and as a linear motion control apparatus.

In general, embodiments of the present invention take place in association with a device having moving parts for which a safety shield is needed to protect a user from injury. Some embodiments of the present invention further take place in association with a device that requires precise and repeatable movements of one or more components in order to successfully test various parameters of a sample product. In this regard, the sample product can comprise virtually any sample product that can be tested with the described device, including, without limitation, one or more IV lines, IV connectors, connectors, valves, syringes, caps, bag spikes, bags, containers, tubes, and/or other devices that can be tested for leaks, pressure decay, vacuum decay, mass flow, occlusion, burst pressure, valve cracking, air pressure, and/or a variety of other features.

In at least one embodiment, the present invention comprises a sample mounting member, which is configured to secure a sample product for testing. In some embodiments, the testing device further includes a mounting member onto which is mounted at least two testing modules. In some such embodiments, the testing device moves the modules to various positions relative to the sample product by moving the mounting member through the use of at least two actuators (e.g., hydraulic cylinders). While the precise movement and tracking of the mounting member can be achieved in any suitable manner, in some instances it is achieved via an interaction between a cam follower coupled to the mounting member, and a motion control cam track provided on the safety shield (or another suitable object). Additionally, in some instances, the precise movement of the mounting member is further achieved via an interaction between a second cam follower coupled to one of the actuators (e.g., hydraulic cylinders), and a second motion control cam track provided on the safety shield (or another suitable object). Each of these features is described below in more detail.

Further embodiments of the present invention include a computer device (e.g., a controller or another computer device) that is operatively coupled to the actuators (e.g., hydraulic cylinders) and the testing modules. The computer system controls the timing and movement of the actuators and coordinates these movements with the performance of activities by the testing modules. The computer system further receives and analyzes data from the testing modules, as may be desired. Accordingly, some embodiments of the present invention further comprise a computer software program having computer executable instructions for performing desired movements of the testing modules within the testing device. Some embodiments further include a computer device which controls various hardware components that are necessary to achieve the movement and functions of the actuators and the testing modules. For example, a computer device may be provided having hydraulic pumps, vacuum pumps, a power source, and/or any other suitable component.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand-alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook computer, a netbook, a tablet computer such as the iPad® manufactured by Apple or any of a variety of Andriod™-based tablet computers produced by multiple manufacturers, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a solid-state drive, a flash drive, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include solid-state drives, flash drives, hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, touch screen, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a Firewire® (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen or other electronic display, a speaker, a printer, a multi-functional peripheral, and the like. A particular output device 34 may be integrated with or peripheral to computer device 10. Examples of output interfaces include a video adapter, an audio adapter, a parallel port, and the like. Examples of electronic displays include monitors, televisions, e-ink displays, projection displays, or any other display capable of displaying changing information under the control of a computer device.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, such as a cloud-based computer environment, where functions or tasks are performed by a plurality of networked computer devices.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones, and other smart devices, tablet computers, or any other device able to provide access to remote computing resources through an access program, such as a browser.

Figure 3A:
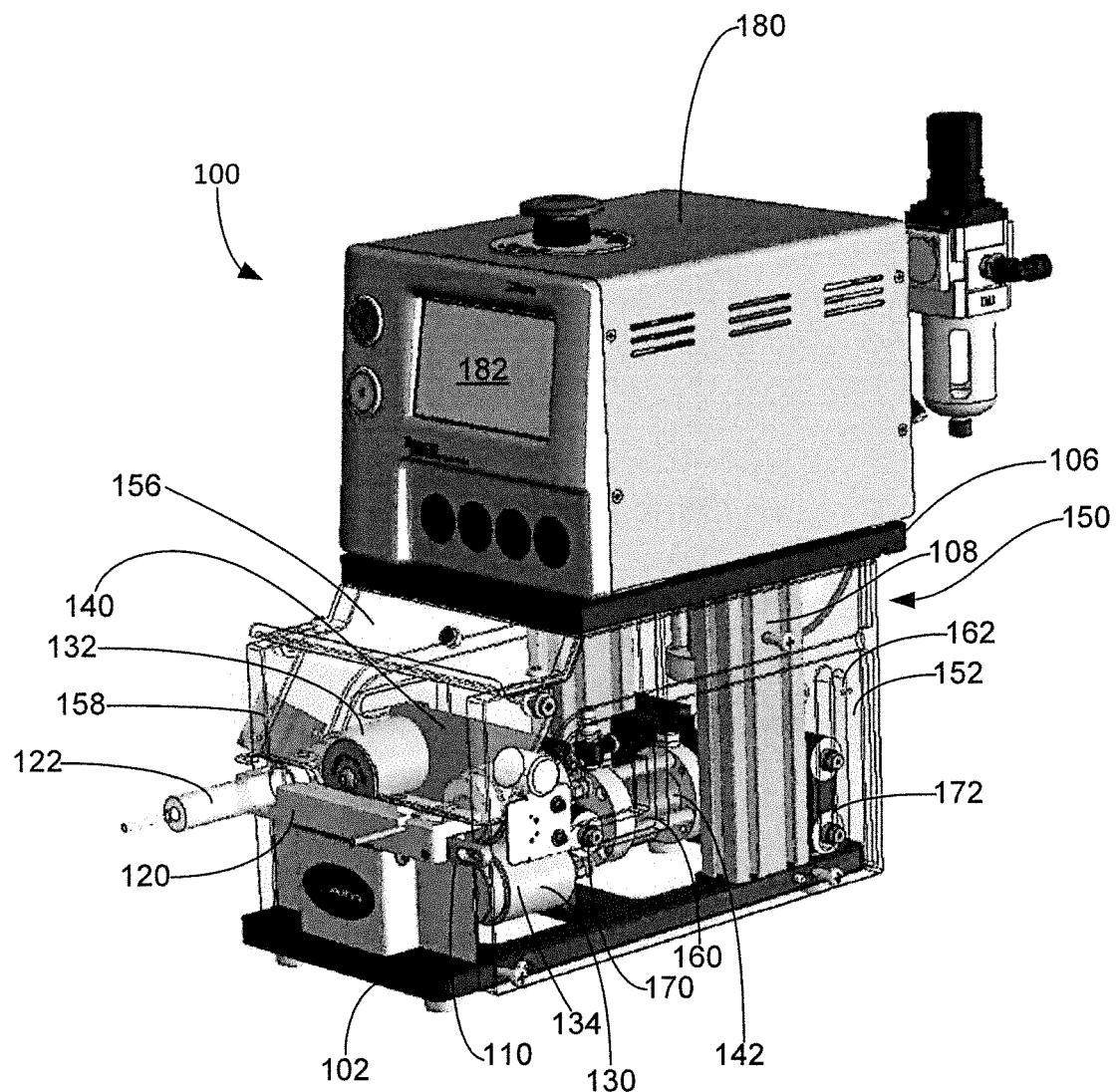
FIG. 3A illustrates a perspective view of a sample testing device having a shield comprising various motion control cam tracks in accordance with a representative embodiment of the present invention.

Referring now to FIG. 3A, a perspective view of a representative embodiment of a testing device 100 is shown. As shown in FIG. 3A, some embodiments of testing device 100 includes a base 102 that is configured to support the testing device on a planar surface, such as a table surface or a floor. In some embodiments, testing device 100 further includes a sample mounting member 110 that is coupled to base 102. While sample mounting member 110 can be connected to base 102 in any suitable manner, in some embodiments, sample mounting member 110 is attached to base 102 via one or more risers. In other embodiments, sample mounting member 110 comprises a portion of base 102.

In some implementations, sample mounting member 110 further comprises one or more nests or sample adapters 120. Sample adapters 120 may include any size, shape, or configuration necessary to support a sample product (or device) 122 in a desired configuration. In some embodiments, however, sample adapter 120 comprises a cage, recess, catch, basket, and/or other shape having an opening into (or a surface onto) which is inserted (or placed) a sample product 122 for testing. Generally, sample adapter 120 is configured to secure and retain a position of sample product 122 during a testing procedure. Sample adapter 120 may further comprise a portion of an automated sample testing system, wherein sample adapter 120 automatically accepts, secures, tests, and ejects sample product 122 as part of a testing procedure.

While the placement of sample adapters 120 on sample mounting member 110 can include any suitable configuration, in some embodiments, such placement is largely dependent upon the configuration of sample product 122, as well as the placement and location of the testing modules 130 of testing device 100. In some embodiments, testing device 100 further comprises a testing module mounting member 140 that is configured to be positioned adjacent to sample mounting member 110. Although testing module mounting member 140 can comprise any suitable characteristic, in some embodiments, it comprises a proximal surface on which is mounted one or more testing modules 130. The precise position of testing modules 130 is such that testing modules 130 may contact and/or interact with sample product 122 when secured in sample adapter 120. In some embodiments, mounting member 140 comprises a first testing module 132 and a second testing module 134, wherein mounting member 140 is moved between a first position and a second position, such that the first position results in contact between sample product 122 and first testing module 132, and the second position results in contact between sampling device 122 and second testing module 134. In other embodiments, mounting member 140 further comprises a second set of testing modules, wherein the first and second positions of mounting member 140 result in contact between a second sample product and the second set of testing modules.

In some implementations, testing device 100 optionally comprises a shelf 106 which is attached to base 102 via a stanchion 108 (or in any of suitable manner). While shelf 106 can perform any suitable function, in some embodiments, it is configured to support a tester 180. In this regard, tester 180 may include any suitable device or combination of devices which are capable of controlling the functions of the various testing modules 130, collecting test data, and/or processing collected data from a testing procedure. In some embodiments, however, tester 180 comprises a display screen 182 on which results from a testing procedure are displayed. Tester 180 may further include hardware and software to actuate one or more actuators (see FIGS. 4A-5, below) which are configured to control the motion and position of mounting member 140 in relation to sample product 122. In some embodiments, tester 180 further comprises a computer device 10 (see e.g., FIGS. 1 and 2), which is capable of performing multiple functions as part of a testing procedure.

In some embodiments, testing device 100 further comprises a safety shield 150. While safety shield 150 can be connected to testing device 100 in any suitable manner, in some embodiments, safety shield 150 is coupled to base 102 via a block 104, and is further coupled to sample mounting member 110. Additionally, while safety shield 150 can comprise any suitable material, in some embodiments, it comprises a shatter resistant material, such as a polycarbonate, polymer, and/or other suitable material that is clear or translucent. Indeed, in some embodiments, safety shield 150 comprises Lexan®. In still other embodiments, safety shield 150 comprises an opaque material.

In some embodiments, safety shield 150 comprises a first side shield 152, a second side shield 154, a top shield 156, and/or an access door 158. Some embodiments of the present invention optionally include a back shield (not shown), or may exclude one or more shield surfaces, as desired. Safety shield 150 is provided as a physical barrier between the user and various moving parts encased within safety shield 150 (e.g., testing module mounting member 140). As such, safety shield 150 can prevent harmful contact between the user and moving parts of testing device 100.

In some embodiments, access door 158 is pivotally attached to first and second side shields 152 and 154 (or to any other suitable object) such that access door 158 is pivotable to an opened position, thereby allowing the user to access testing modules 130 and various other parts and/or components encased within safety shield 150. In some embodiments, a bottom edge of access door 158 is further configured to interact with sample adapter 120 and sample product 122, such that access door 158 assists in maintaining the position of sample product 122 in sample adapter 120 during the testing procedure. Accordingly (in such embodiments), following the testing procedure, access door 158 is pivoted to an opened position thereby releasing sample product 122 from sample adapter 120.

In some embodiments, access door 158 optionally includes a switch (e.g., a magnetic switch, a pressure-activated switch, and/or any other suitable switch) (not shown) which is coupled to tester 180. In some such embodiments, the switch (e.g., a magnetic switch) is activated upon pivoting access door 158 to a closed position. Prior to activation, the various moving components within safety shield 150 are prevented from moving. However, once the switch is activated, the testing procedure may commence without the risk of injury to the user.

Testing device 100 can comprise any suitable device that allows testing module mounting member 140 to move between its first and second position. Indeed, in some embodiments, testing device 100 comprises one or more cam track, rails, guides, tracks, grooves and followers, and/or other suitable components that allows testing module mounting member to repeatably move between its first and section positions. In some embodiments, however, safety shield 150 further comprises one or more motion control cam tracks 160. While such motion control cam tracks 160 can stand alone or be attached to any suitable object, in some embodiments, motion control cam tracks 160 generally comprise grooves or channels that are created within the wall thickness of first and second side shields 152 and 154. Indeed, in some embodiments, motion control cam tracks 160 comprise channels formed on an inner surface of first and second side shields 152 and 154 of safety shield 150. Motion control cam tracks 160 may include any suitable shape, size, length, width, depth, and/or configuration as may be desired.

In some embodiments in which testing device 100 comprises motion control cam tracks 160, the cam tracks are configured to receive one or more cam followers 170 which are attached to testing module mounting member 140. In some such embodiments, cam followers 170 are configured to move within motion control cam tracks 160, thereby guiding or controlling the movement of mounting member 140 within (or with respect to) safety shield 150. In some embodiments, additional cam followers 172 are attached to an actuator (e.g., hydraulic cylinder, pneumatic actuator, electric actuator, mechanical actuator, roller screw, linear actuator, etc.), whereby the additional cam followers 172 ride within a second motion control cam track 162 thereby controlling the vertical movement of the actuator (e.g., hydraulic cylinder) within safety shield 150, as will be discussed in detail below. Accordingly, in some embodiments, the configuration of motion control cam tracks 160 and 162 determines the controlled path which mounting member 140 and the actuator (e.g., hydraulic cylinder) travel within safety shield 150. The interaction between cam followers 170 and 172, and their respective motion control cam tracks 160 and 162 provides precise and repeatable movement of the respective component within safety shield 150. Further, in some embodiments in which motion control cam tracks are defined within first and second side 152 and 154 of safety shield 150, the placement of cam followers 170 and 172 within motion control cam tracks 160 and 162 prevents the user from being injured due to contacting cam followers 170 and 172 during a testing procedure.

Figure 3B:
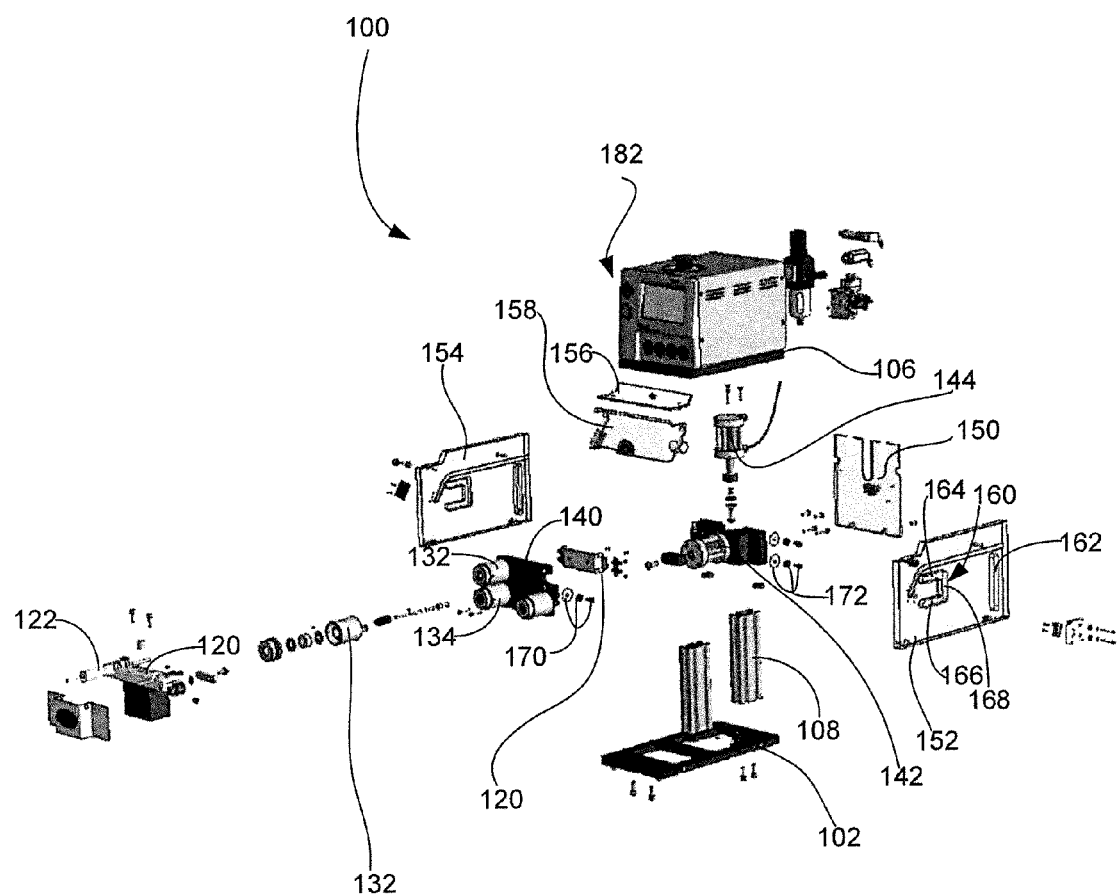
FIG. 3B illustrates an exploded perspective view of a representative embodiment of the present invention.
Figure 3C:
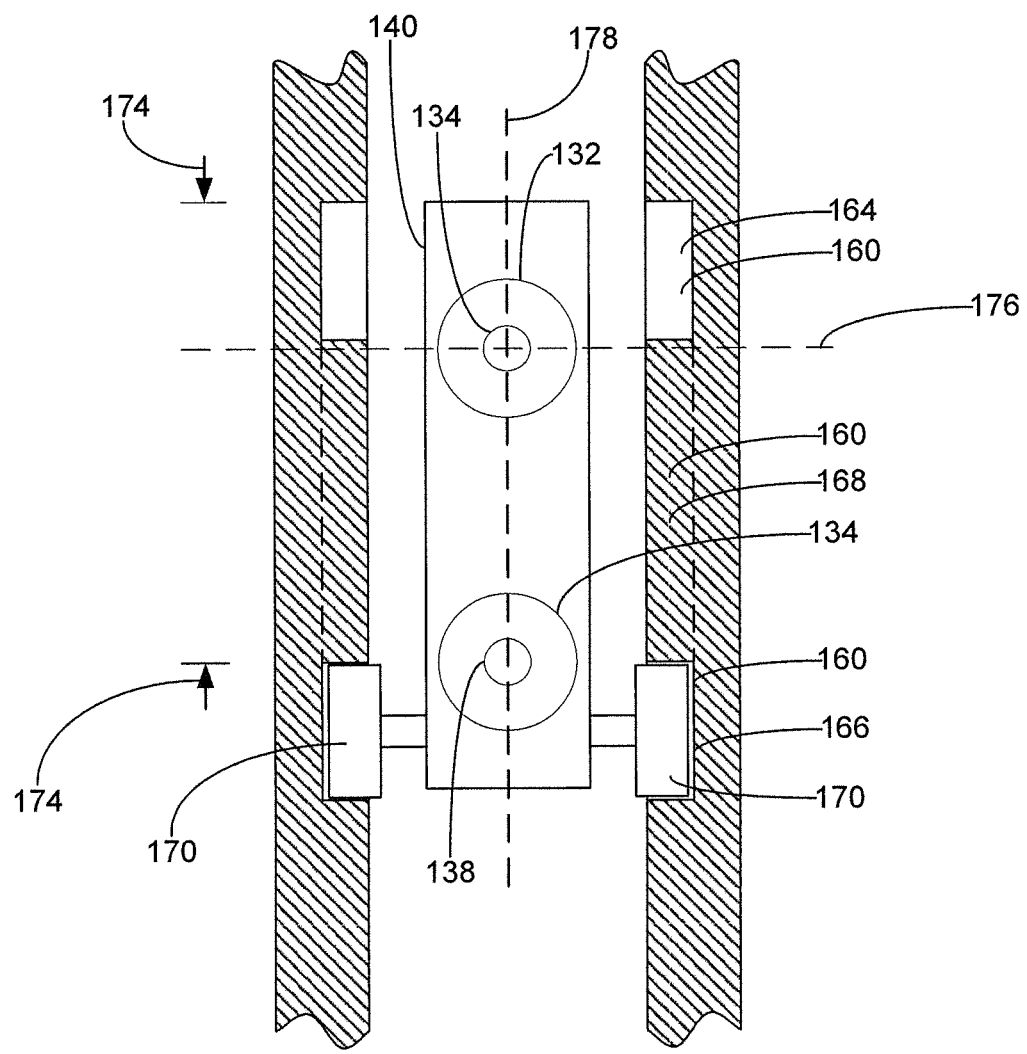
FIG. 3C illustrates a front, cross-sectional view of a shield comprising various motion control cam tracks in accordance with a representative embodiment of the present invention.

Referring now to FIGS. 3A through 3C, in some embodiments, motion control cam track 160 optionally comprises a bi-directional cam having a C-shaped configuration, wherein the C-shape comprises an upper substantially horizontal channel 164 interconnected to a lower substantially horizontal channel 166 via a substantially vertical channel 168. In some such embodiments, motion control cam track 160 is configured such that upper and lower horizontal channels 164 and 166 control forward and backward motion of mounting member 140 within safety shield 150. Additionally, in some such embodiments, vertical channel 168 of motion control cam track 160 is configured to control upward and downward motion of mounting member 140 within safety shield 150.

In some embodiments, the length of vertical channel 168 is selected such that upper horizontal channel 164 is spaced from lower horizontal channel 166 at a distance 174. In some such embodiments, distance 174 is selected such that first testing module 132 (e.g., a testing portion of the module) is vertically centered on a horizontal plane 176 when cam follower 170 is located in lower horizontal channel 166, and second testing module 134 (e.g., a testing portion of the module) is horizontally centered on vertical plane 176 when cam follower 170 is located in upper horizontal channel 164. Thus, in some embodiments, sample product 122 is positioned in sample adapter 120 such that a portion of sample product 122 that is intended to contact testing modules 130 is centered on horizontal plane 176. Further, in some embodiments, testing modules 130 are positioned on mounting member 140 such that testing modules 130 are horizontally centered on vertical plane 178. Accordingly, in some embodiments, sample adapter 120 is positioned on sample mounting member 110 such that the portion of sample product 122 that is intended to contact testing module 130 is further centered on vertical plane 178 when sample product 122 is secured within sample adapter 120.

In some embodiments, testing device 100 is configured to test a single sample product 122. In other embodiments, testing device 100 is configured to simultaneously (and/or serially) test multiple sample products 122. Accordingly, one having skill in the art will appreciate that the present invention may be scaled and/or adjusted as desired to test any number of sample products as part of a testing procedure. Further, one having skill in the art will appreciate that mounting member 140 may include any number and/or configuration of testing modules 130. Additionally, the present invention may include any number, size, length, and/or configuration of motion control cam tracks 160 and 162 as may be necessary to achieve contact between the testing modules 130 and the sample products 122.

Figure 4A:
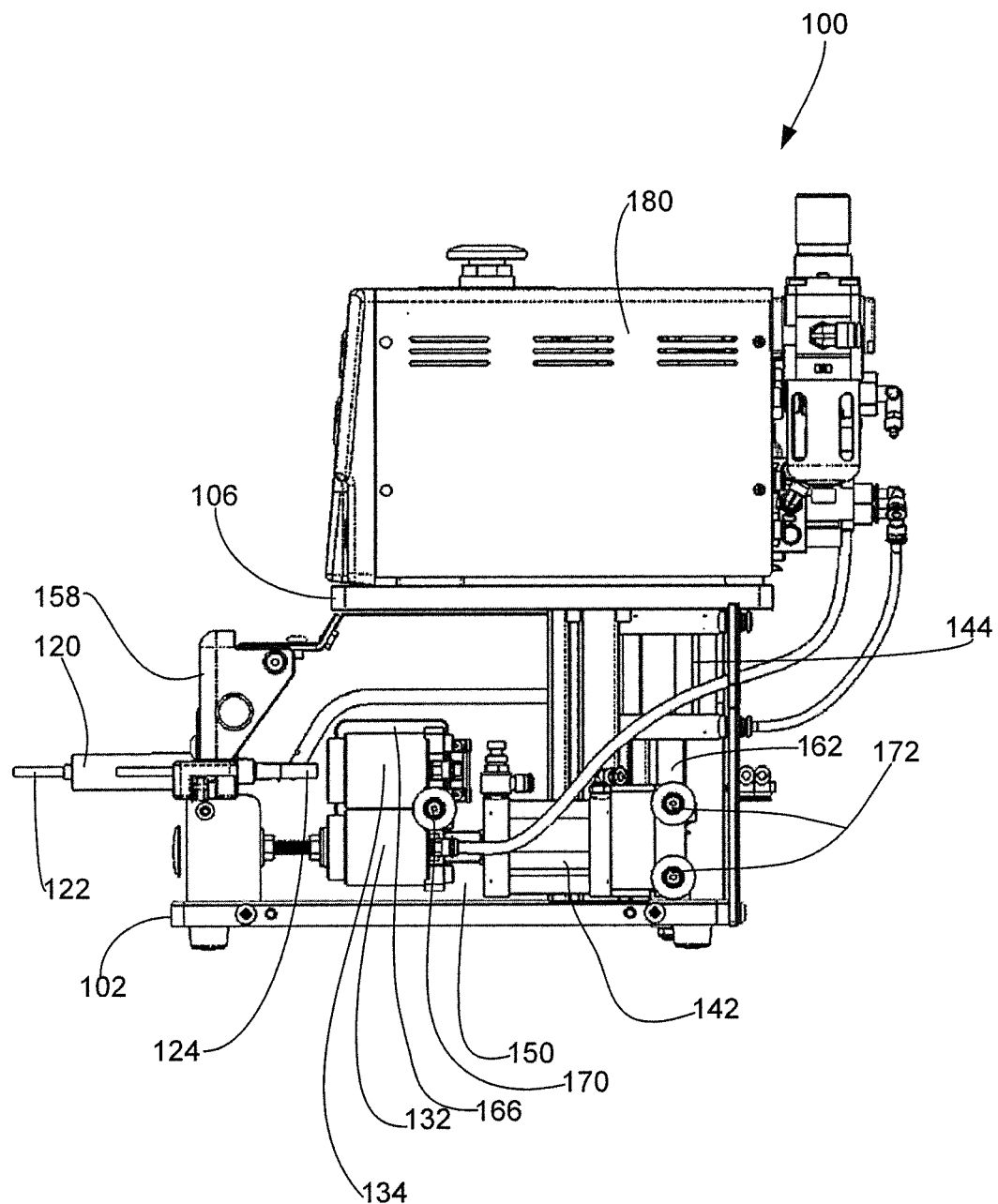
FIG. 4, shown in parts A through E, illustrates multiple plan side views of a sample product testing device undergoing a method or procedure for testing a sample product in accordance with a representative embodiment of the present invention.

Referring now to FIGS. 4A-4E, a schematic side view of a representative embodiment of testing device 100 is shown at various steps through a representative embodiment of a testing procedure. As mentioned previously, in some embodiments, testing device 100 comprises a testing module mounting member 140 having a cam follower 170 that is positioned and travels within motion control cam track 160. Additionally, as mentioned above, testing device 100 comprises two or more actuators. While such actuators can comprise any suitable actuators, in some embodiments, the actuators each comprise a hydraulic cylinder. For simplicity, the following discussion focuses on embodiments comprising hydraulic cylinders, though any other suitable actuator may also be used. Thus, in accordance with at least some embodiments, FIG. 4A shows testing device 100 comprises a first actuator or hydraulic cylinder 142 which is positioned within safety shield 150 such that a portion (e.g., piston) of first hydraulic cylinder 142 moves in a substantially horizontal plane, in an x-axis, and/or in any other suitable first plane. In some such embodiments, a portion (e.g., piston) of first hydraulic cylinder 142 is attached to mounting member 140, thereby facilitating movement of mounting member 140 in the first plane (e.g., x-axis). In some implementations, first hydraulic cylinder 142 further comprises a pair of cam followers 172 which are positioned on a base portion of first hydraulic cylinder 142. In some embodiments, the pair of cam followers 172 comprises a portion of a mounting member to which a base portion of first hydraulic cylinder 142 is attached. In some such embodiments, the pair of cam followers 172 is configured to ride within motion control cam track 162 in a vertical plane, in a y-axis, and/or in any other suitable second plane (e.g., a plane that runs substantially perpendicular to the first plane). In some embodiments, the pair of cam followers 172 further prevents first hydraulic cylinder 142 (or first actuator) from sagging while traveling along the y-axis (or second plane).

In accordance with some implementations of the present invention, first hydraulic cylinder 142 (or another first actuator) is moved along the y-axis (or another second plane) by a second hydraulic cylinder 144 (or second actuator) which is positioned within safety shield 150 such that a piston (or other suitable portion) of second hydraulic cylinder 144 moves in a vertical plane, or in a y-axis. The piston (or another suitable portion) of second hydraulic cylinder 144 is attached to at least one of the base of first hydraulic cylinder 142, a plate to which the base of first hydraulic cylinder 142 is attached, and/or to another suitable object. In some embodiments, the base of second hydraulic cylinder 144 is optionally secured to the underside of shelf 106.

In some implementations, the position of mounting member 140 along the x-axis and y-axis is a function of the combined actuations of first and second hydraulic cylinders 142 and 144. Accordingly, in some embodiments, testing device 100 further comprises a computer software program comprising computer executable instructions for actuating the first and second hydraulic cylinders 142 and 144 to initiate contact between the sample product 122 and the first and second testing modules 132 and 134. The computer software program may further include computer executable instructions for executing various analytical or testing functions of the testing modules as part of a testing procedure. Indeed, in some embodiments, a computer software program comprises computer executable instructions for removing a cap from a sample product, performing a testing function (such as performing a leak, occlusion, and/or flow test on the uncapped sample product), and recapping the sample product.

Testing device 100 may include a first testing module 132 configured to perform a first testing function, and further include a second testing module 134 configured to perform a second testing function. Indeed, in some embodiments a first testing device 132 comprises a radial sealing device having a hole 136 which is configured to receive, remove, and temporarily retain a cap 124 of sample product 122. Prior to removing cap 124, first and second hydraulic cylinders 142 and 144 are actuated to positioned cam follower 170 in the backward or distal position of lower horizontal channel 166, as shown in FIG. 4A. Cap 124 is removed from sample product 122 as first hydraulic cylinder 142 is actuated, thereby moving cam follower 170 and base plate 140 along the x-axis in proximal direction 190, to the position shown in FIG. 4B.

Figure 4B:
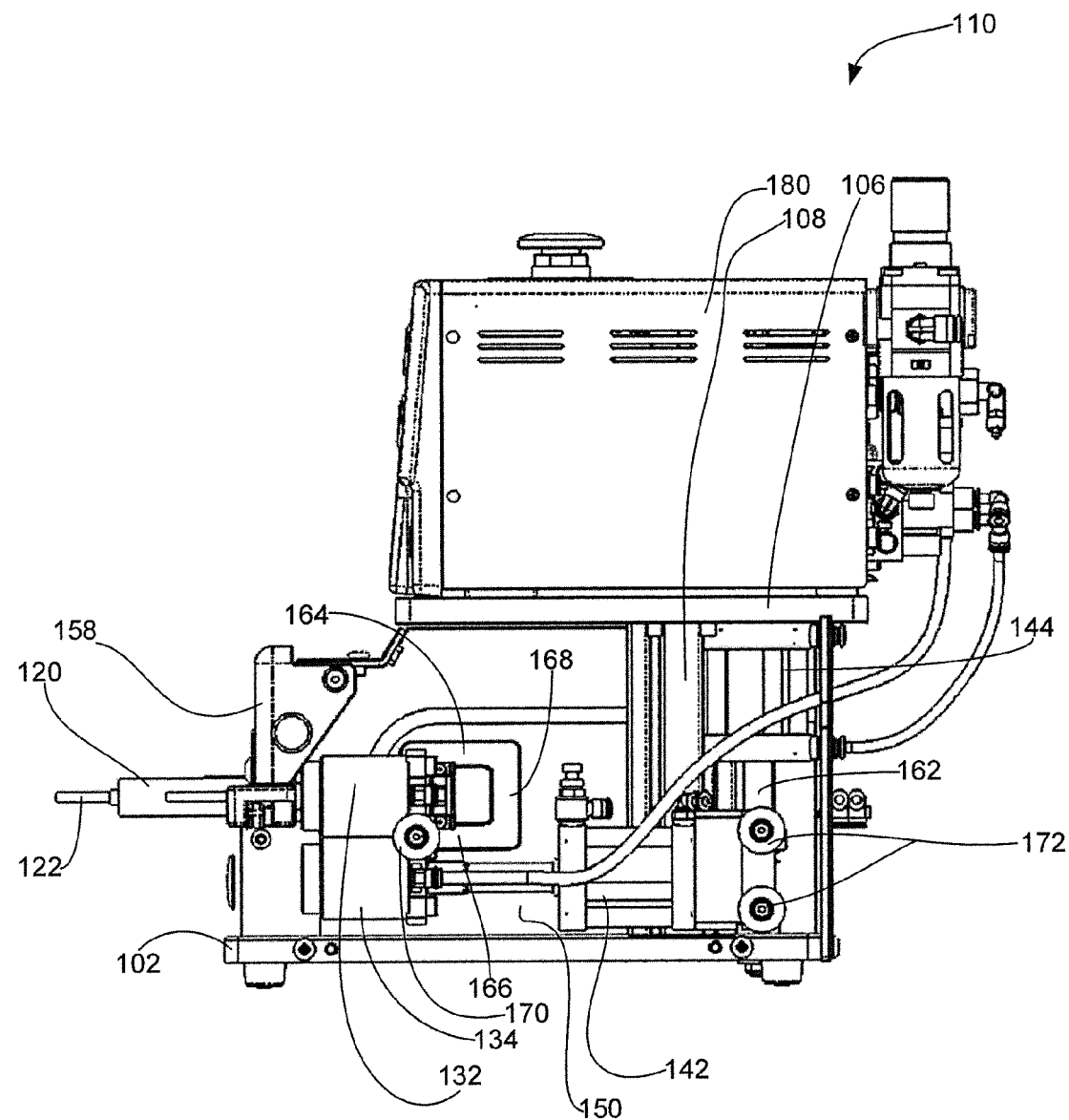

The position shown in FIG. 4B results in cap 124 of sample product 122 being positioned within hole 136 of first testing module 132. In some embodiments, first testing module 132 comprises a radial sealing device having an annular seal which contacts the outer surface of cap 124 thereby temporarily securing and retaining cap 124 within hole 136. Cap 124 is removed from sample product 122 as the piston of first hydraulic cylinder 142 is retracted in a backward or distal direction 192 along the x-axis, to the position shown in FIG. 4C.

Figure 4C:
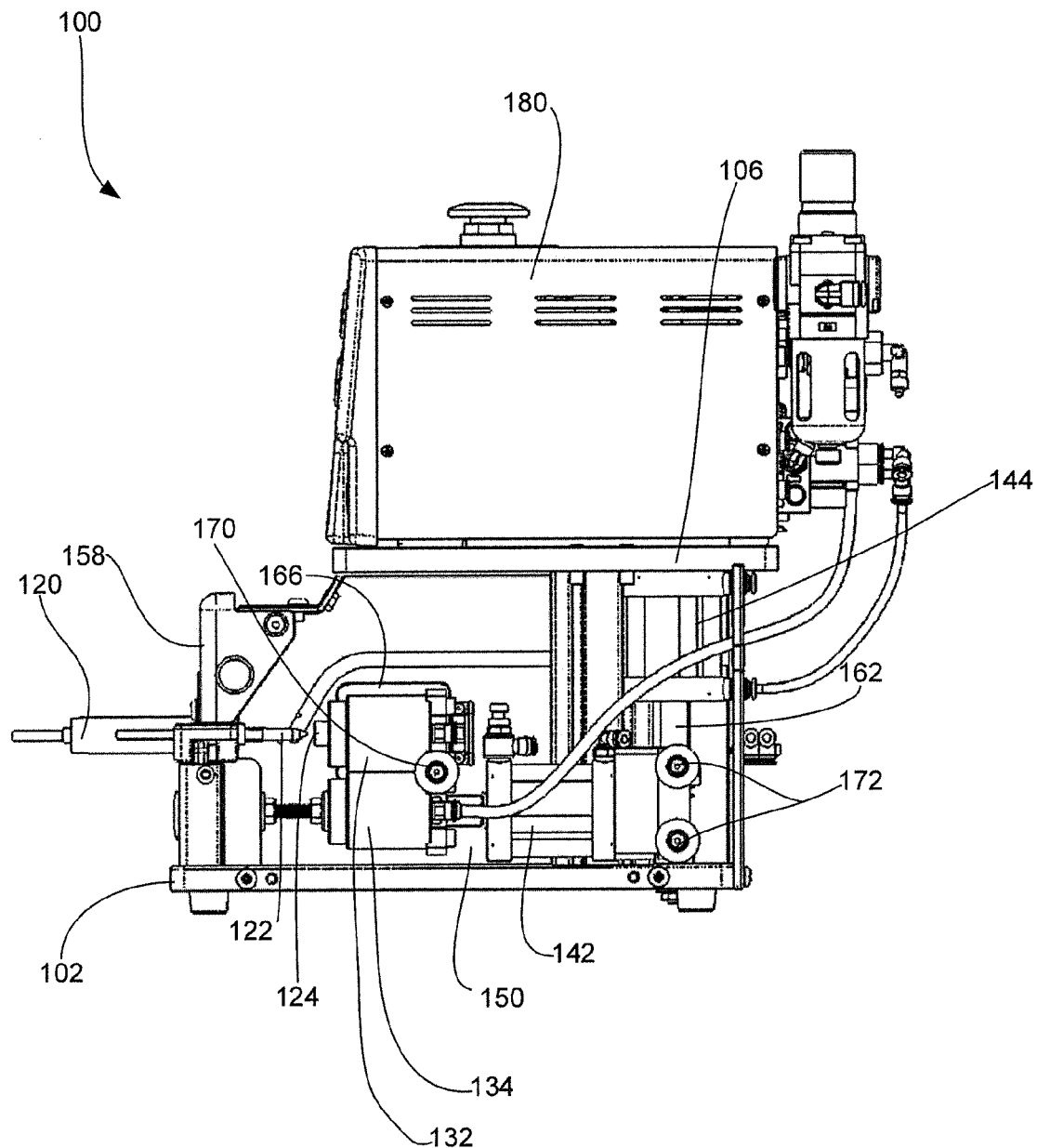

In some embodiments, the position shown in FIG. 4C completes the removal of cap 124 from sample product 122. In such embodiments, mounting member 140 is then moved in an upward direction 194 along the y-axis as the piston of second hydraulic cylinder 144 is retracted. Cam followers 172 ride within motion control cam track 162 to reposition cam follower 170 within vertical channel 168. In some embodiments, the length of motion control cam track 162 is configured such that the maximum upward movement of cam followers 172 moves cam follower 170 from lower horizontal channel 166 to upper horizontal channel 164. In other embodiments, the travel distance of cam followers 172 within motion control cam track 162 is controlled by tester 180, or another computer device. Cam followers 172 are moved within motion control cam track 162 such that cam follower 170 travels through vertical channel 168 to the position shown in FIG. 4D.

Figure 4D:
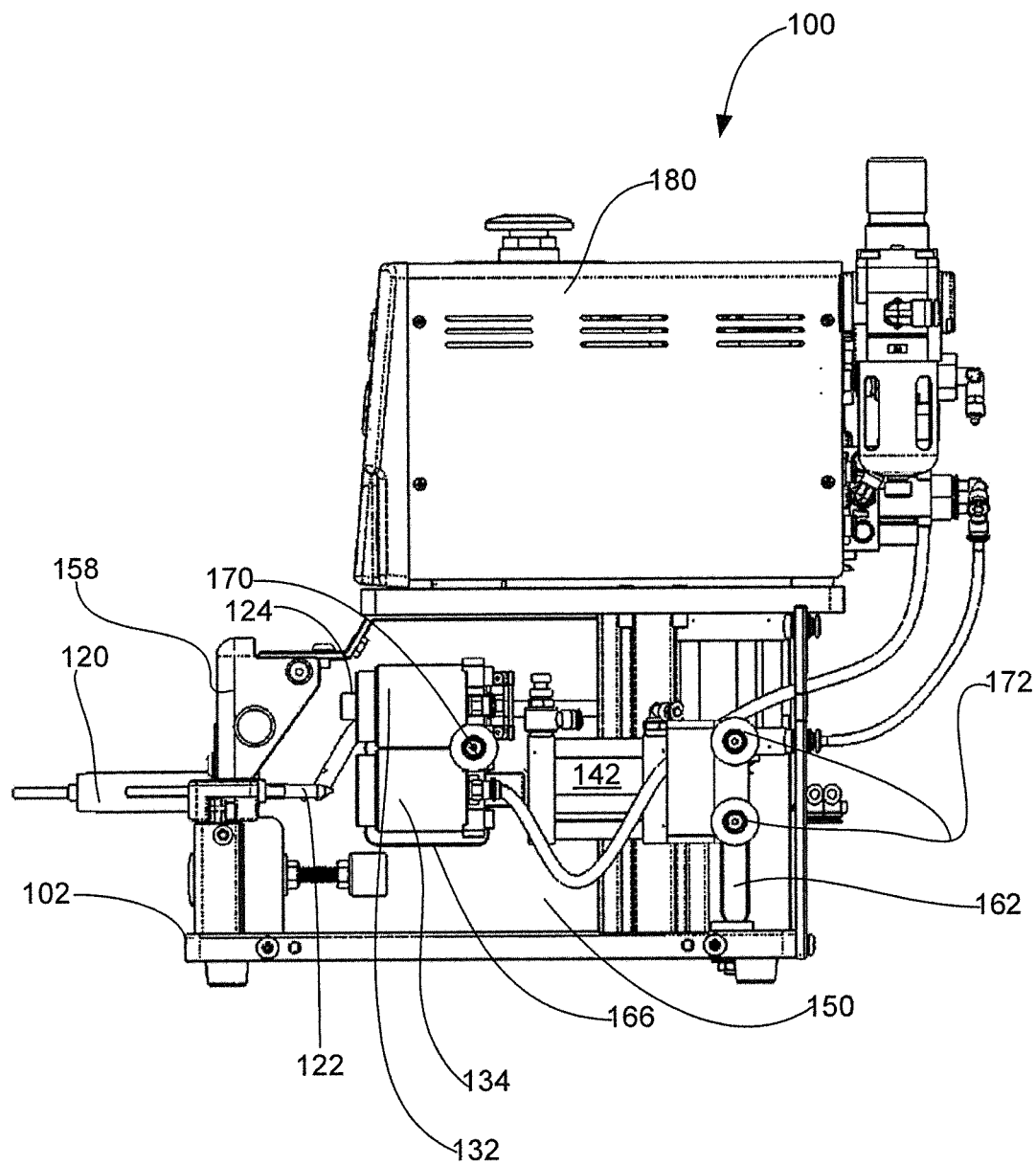

Referring now to FIG. 4D, the position of cam follower 170 on mounting block 140 is selected such that when cam follower 170 is positioned within upper horizontal channel 166, an opening or hole of testing module 134 is an axial alignment with the uncapped portion of sample product 122. In some embodiments, motion control cam track 160 comprises three or more horizontal channels (not shown) interconnected by an extended vertical channel 168, wherein each of the horizontal channels are spaced to facilitate interaction between sample product 122 and a respective testing module mounted to mounting member 140.

Figure 4E:
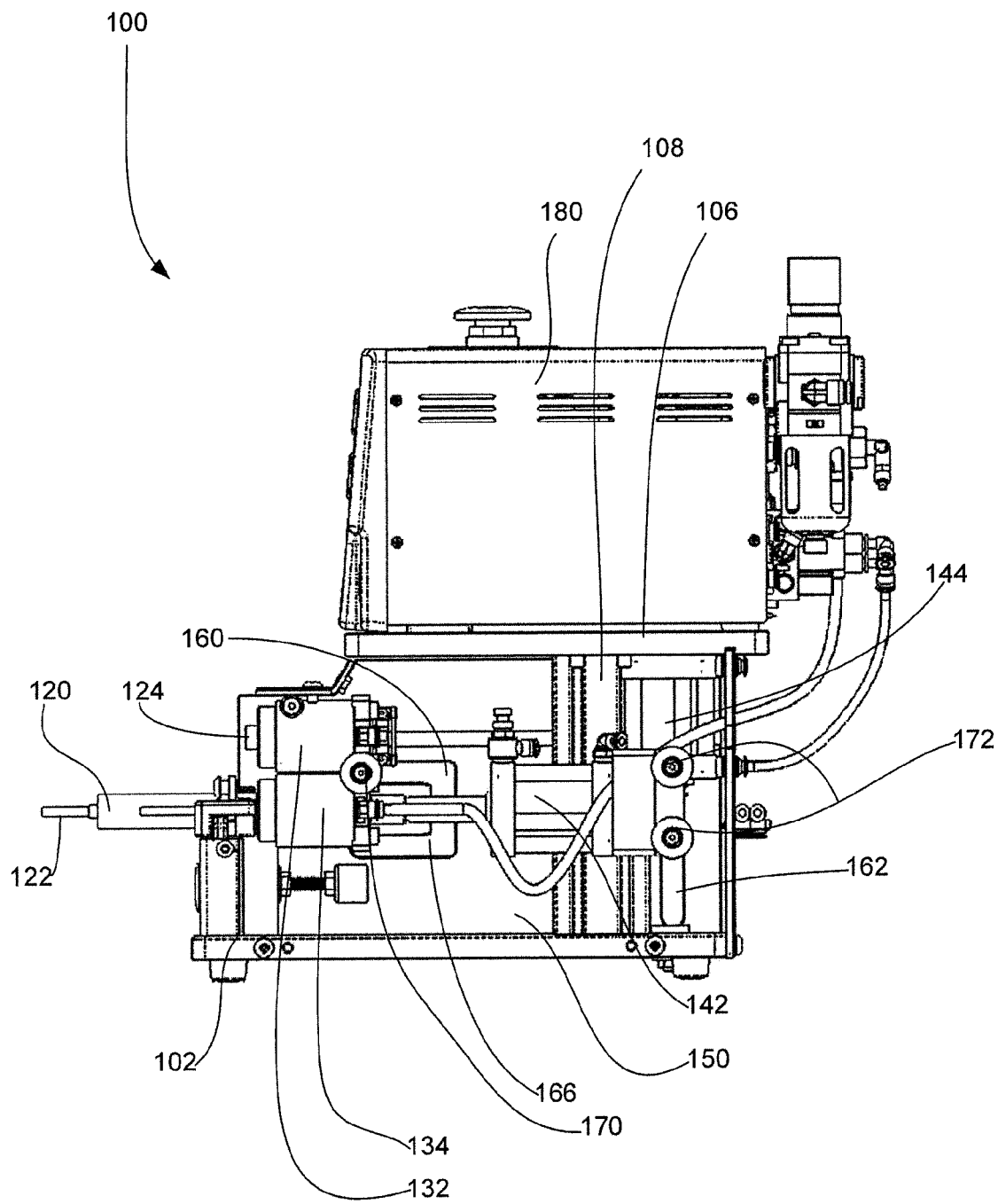

Referring now to FIG. 4E, that figures shows that, in some embodiments, testing module 134 is brought into contact with the uncapped portion of sample product 122 as the piston of first hydraulic cylinder 142 is extended in proximal direction 190. Testing module 134 may then undergo a testing procedure. In this regard, in some embodiments, testing module 134 comprises a radial sealing device which is connected to a vacuum pump via a vacuum line. Testing module 134 further comprises a gasket which forms a seal around the uncapped portion of sample product 122. Once a seal has been established between testing module 134 and sample product 122, a vacuum is applied to sample product 122 to check for leaks. Data related to testing modules 132 and 134 is received by tester 180 for further analysis and processing.

Following completion of some embodiments of the testing procedure, sample product 122 is recapped by reversing the steps shown in FIGS. 4A-4E. Testing of additional sample products may be achieved by replacing sample product 122 with a new sample product. In some embodiments, sample mounting member 110 comprises a plurality of sample adapters 120, wherein sample product 122 is sequentially placed in each of the sample adapters to undergo additional testing. Testing device 100 may further comprise a plurality of different sample adapters, wherein each sample adapter is configured to receive and retain a different sample product for testing.

In some embodiments, testing modules 132 and 134 further comprise an adjustable photo-electric barrel sensor that is provided to detect the presence of cap 124 and/or an uncapped portion of sample product 122. This sensor may be useful in signaling or monitoring the progress of testing modules 132 and/or 134 during a testing procedure. For example, the adjustable photo-electric barrel sensor may send a signal to tester 180 following detection and capture of cap 124. Tester 180 may then send instructions to first and second hydraulic cylinders 142 and 144 to move mounting member 140 to a second position wherein the uncapped sample product is further tested. The sensors may further indicate completion of the testing procedure, wherein the sensor senses when the cap is no longer secured within testing module 132. The photo-electric barrel sensor may further detect and report an error, whereupon the testing procedure is stopped and an alert is generated. Testing device 100 may further include various other sensors to assist in coordinating the movement of mounting member 140 and in detecting the progress and errors during a testing procedure.

Figure 5:
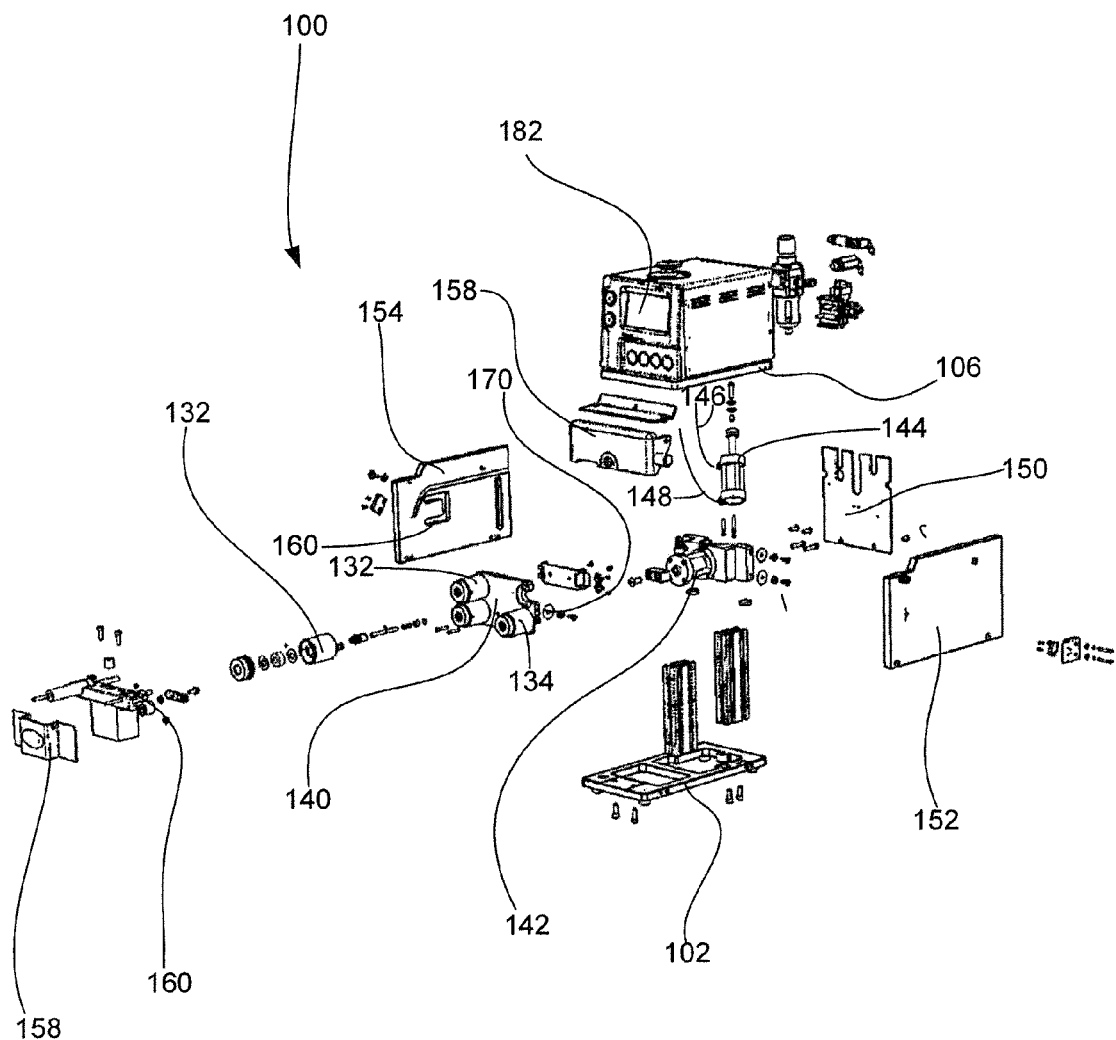
FIG. 5 shows an exploded, perspective view of a representative embodiment of the present invention.

Testing device 100 may include any structural configuration or setup in accordance with the underlying teachings of the present invention. Indeed, in some embodiments, a testing device is provided which does not include an onboard tester. Additionally, FIG. 5 shows that, in some embodiments, second hydraulic cylinder 144 is mounted to base 102. Hydraulic lines 146 and data/vacuum lines 148 are routed to external devices, such as an off-site tester, a hydraulic pump, a power source, and a vacuum pump. One having skill in the art will appreciate that the configuration shown in FIG. 5 may be modified in any number of alternative configurations to achieve bi-directional movement of mounting member 140 within safety shield 150.

In still other embodiments, testing device 100 can comprise any suitable number of testing modules 130 that can be useful in testing a sample product 122. Indeed, instead of simply comprising first and second testing modules 132 and 134 to test a single sample product 122, some embodiments of the testing device 100 comprise 3, 4, or more testing modules configured to be used in the testing of a single product sample. In such embodiments, cam track 160 can comprise any suitable number of channels (e.g., channel for each testing module) in the first plane (e.g., horizontal channels).

In still other embodiments, instead of moving testing module mounting member 140 bi-directionally along a y-axis and an x-axis, some other embodiments of testing device 100 are configured with testing module mounting member 140 being moved bi-directionally along a z-axis and the x-axis (e.g., cam tracks 160 are disposed on top shield 156 and a base 102 of testing device, testing device 100 is placed on its side, etc.).

In yet other embodiments, instead of maintaining sample product 122 in a stationary position while first and second testing modules 132 and 134 are moved, in other embodiments, testing device 100 is configured to move sample product 122 while keeping testing modules 132 and 134 stationary (e.g., testing modules 132 and 134 are disposed on sample testing plate and sample adapter 120 is disposed on testing module mounting member 140).

Figure 6:
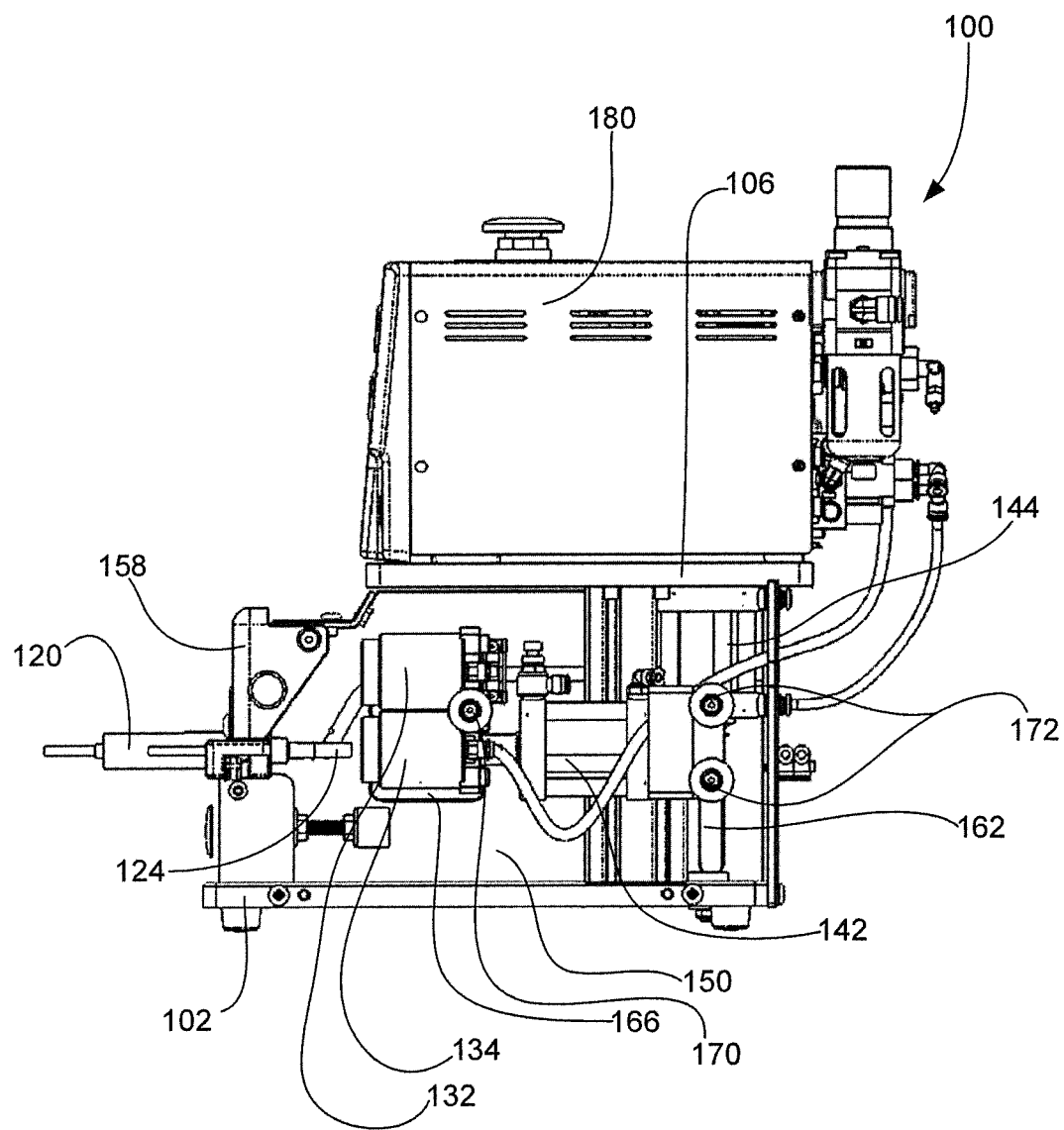
FIG. 6 shows a plan side view of an alternative configuration of a sample testing device in accordance with a representative embodiment of the present invention.

In still other embodiments, instead of using first testing module 132 to remove cap 124 from sample product 122, second testing module 134 is configured to remove cap 124. By way of non-limiting illustration, FIG. 6 illustrates such an embodiment.

Thus, the present invention relates to testing devices. In particular, some implementations of the present invention relate to a testing device that is configured to remove a cap from a sample product or device (such as an IV line), test the sample product for leaks or for another characteristic, and to then replace the cap on the device. While the testing device can include any suitable component that allows it to function as described, in some implementations, it includes a safety shield which acts as an anti-pinch guard, and which also includes one or more motion control cam tracks that are configured to control movement of one or more testing modules encased within the shield. Accordingly, in some such implementations, the safety shield is able to perform multiple functions, acting both as a safety apparatus and as a linear motion control apparatus.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A testing device, comprising:
a base;
a sample adapter coupled to the base;
a mounting member coupled to a first actuator, the first actuator being mounted to a second actuator, the second actuator being fixedly coupled to the base;
a first testing module coupled to the mounting member at a first position;
a second testing module coupled to the mounting member at a second position;
a first cam follower coupled to the mounting member;
a second cam follower coupled to the first actuator;
a safety shield coupled to the base, the shield having a first motion control cam track configured to receive the first cam follower, and further comprising a second motion control cam track configured to receive the second cam follower, wherein the first motion control cam track controls a motion of the first cam follower in a first plane and a second plane that is substantially perpendicular to the first plane, and wherein the second motion control cam track controls a motion of the second cam follower in the second plane.

2. The device of claim 1, wherein the first actuator is configured to move the mounting member in the first plane, and the second actuator is configured to move the first actuator in the second plane, such that the mounting member moves in the second plane along with the first actuator.

3. The device of claim 1, further comprising a stanchion having a first end coupled to the base and a second end coupled to a shelf, wherein the second actuator is fixedly coupled to the shelf.

4. The device of claim 1, wherein the first and second motion control cam tracks comprise a channel formed in an inner surface of the safety shield.

5. The device of claim 1, wherein the first motion control cam track comprises a c-shaped track.

6. The device of claim 5, wherein the c-shape comprises an upper horizontal channel interconnected to a lower horizontal channel via a vertical channel.

7. The device of claim 6, wherein a distance between the upper horizontal channel and the lower horizontal channel is approximately equal to a distance between a testing portion of the first testing module and a testing portion of the second testing module.

8. The device of claim 6, wherein when the first cam follower is positioned in the vertical channel and a sample product is secured in the sample adapter, the first and second testing modules are separated from the sample product, and when the first cam follower is positioned in the first or second horizontal channels and the sample product is secured in the sample adapter, the first or second testing modules contact a portion of the sample product.

9. The device of claim 1, further including a computer software program comprising computer executable instructions for:
actuating the first and second actuators to initiate contact between a portion of a sample product in the sample adapter and the first testing module;
executing a first testing function;
actuating the first and second actuators to initiate contact between the sample product and the second testing module;
executing a second testing function; and
reporting information from at least one of the first and second testing modules.

10. The device of claim 9, wherein the computer executable instructions further comprise a step for actuating the first and second actuators to reinitiate contact between the portion of the sample product and the first testing module to execute a third testing function.

11. The device of claim 10, wherein the first testing function is to remove a cap from the sample product, the second testing function is to perform a leak and flow test on the uncapped sample product, and the third testing function is to recap the sample product.

* * * * *